(12) United States Patent
Chen

(10) Patent No.: US 11,803,066 B2
(45) Date of Patent: Oct. 31, 2023

(54) BEAM-SPLITTING ELEMENT AND PROJECTION DEVICE

(71) Applicant: Coretronic Corporation, Hsin-Chu (TW)

(72) Inventor: Chang-Hsuan Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/521,780

(22) Filed: Nov. 8, 2021

(65) Prior Publication Data

US 2022/0163811 A1 May 26, 2022

(30) Foreign Application Priority Data

Nov. 23, 2020 (CN) .......................... 202011317929.9

(51) Int. Cl.
*G02B 27/12* (2006.01)
*G03B 21/20* (2006.01)
(Continued)

(52) U.S. Cl.
CPC ......... *G02B 27/12* (2013.01); *G02B 27/1006* (2013.01); *G02B 27/18* (2013.01); *G03B 21/204* (2013.01); *G03B 21/2066* (2013.01)

(58) Field of Classification Search
CPC .... G02B 27/12; G02B 27/1006; G02B 27/18; G02B 5/0284; G02B 5/201;
(Continued)

(56) References Cited

U.S. PATENT DOCUMENTS

2002/0109076 A1* 8/2002 Tochio ............... G02B 26/0841
250/214 SW
2015/0362830 A1* 12/2015 Liao ................... G03B 21/2066
353/31
(Continued)

FOREIGN PATENT DOCUMENTS

CN 101109891 1/2008
CN 101329422 12/2008
(Continued)

OTHER PUBLICATIONS

"Office Action of China Counterpart Application", dated Nov. 1, 2022, pp. 1-10.

*Primary Examiner* — Magda Cruz
(74) *Attorney, Agent, or Firm* — JCIPRNET

(57) ABSTRACT

A beam-splitting element and a projection device provide an image with good uniformity. The beam-splitting element has first and second regions, and the beam-splitting element includes first and second pattern films. The first pattern film is located on the second region and allows a light beam with an emission wavelength within a first waveband range to penetrate. The second pattern film is located on the second region and reflects the light beam with the emission wavelength within the first waveband range. The first and second pattern films are not overlapped with each other, and the first and second pattern films form a beam-splitting pattern together on the second region. A ratio of an area of the first pattern film occupied in the second region is between 30% and 70%. The beam-splitting element of the invention provides an image projected from the projection device with good uniformity.

24 Claims, 7 Drawing Sheets

(51) Int. Cl.
*G02B 27/10* (2006.01)
*G02B 27/18* (2006.01)

(58) Field of Classification Search
CPC .............. G02B 19/0014; G02B 26/008; G02B 27/141; G03B 21/204; G03B 21/2066; G03B 21/2013; G03B 21/2033; G03B 21/208

See application file for complete search history.

(56) References Cited

U.S. PATENT DOCUMENTS

| | | | | |
|---|---|---|---|---|
| 2016/0327851 | A1* | 11/2016 | Liao | G03B 21/2066 |
| 2018/0157050 | A1* | 6/2018 | Liao | G03B 21/2066 |
| 2020/0159101 | A1* | 5/2020 | Fan | G03B 21/208 |
| 2020/0319542 | A1* | 10/2020 | Pan | G02B 27/141 |
| 2021/0037222 | A1* | 2/2021 | Huang | G03B 21/204 |

FOREIGN PATENT DOCUMENTS

| | | |
|---|---|---|
| CN | 101419341 | 4/2009 |
| CN | 206819040 | 12/2017 |
| CN | 108153089 | 6/2018 |
| JP | 2002258422 | 9/2002 |
| JP | 2002277850 | 9/2002 |
| JP | 2003185972 | 7/2003 |
| JP | 2007003692 | 1/2007 |
| TW | 201546495 | 12/2015 |
| TW | I644263 | 12/2018 |

* cited by examiner

BEAM-SPLITTING ELEMENT AND PROJECTION DEVICE

CROSS-REFERENCE TO RELATED APPLICATION

This application claims the priority benefit of China application serial no. 202011317929.9, filed on Nov. 23, 2020. The entirety of the above-mentioned patent application is hereby incorporated by reference herein and made a part of this specification.

BACKGROUND OF THE INVENTION

Field of the Invention

The invention relates to an optical element and an optical device, and particularly relates to a beam-splitting element and a projection device.

Description of Related Art

Recently, projection devices based on a solid-state light source such as a light-emitting diode (LED) and a laser diode have gradually gained a place in the market. Since the laser diode has a luminous efficiency higher than about 20%, in order to break through the light source limitation of the LED, models that adopt a laser light source as the light source required for projectors have gradually been developed.

Generally, a projection device adopting a laser light source as the light source includes an arrangement of optical modules such as a wavelength conversion module, a light filter module, a light valve, and a projection lens. Specifically, the light filter module is disposed on the downstream of the light path of the wavelength conversion module, so that colored lights of different wavebands from the wavelength conversion module may be filtered into predetermined colored lights after passing through the light filter module so as to purify the colors and achieve the effect of color saturation. Then, these colored lights are adjusted by a light-homogenizing element for the uniformity of the colored lights, and then an image beam is projected to the outside via the modulation of the light valve.

However, in the prior art, in order to reduce the size of the system and the limitation of light path design, the light source may only be placed on a specific side of the system. Therefore, when being transmitted to the light-homogenizing element, the angle and the energy distribution of the colored lights entering the light-homogenizing element are also limited. As a result, the number of times of homogenization caused by reflection in the light-homogenizing element is relatively smaller, thus readily causing the issue of low uniformity image projected by the subsequent light valve.

In this regard, there is a type of beam-splitting element in which all parts of a single-piece beam-splitting film coated thereon may allow a part of a light beam with a specific wavelength to penetrate and reflect the other part at the same time. In this way, the angle at which the colored lights enter the light-homogenizing element and the energy distribution are further controlled to improve the uniformity of the image. However, since the manufacture of this single piece of beam-splitting film is susceptible to the limitation of the manufacture tolerance of the coating, the ratio of penetration or reflection of the light beam with a specific wavelength also produces an error depending on the incident position. Therefore, the angle and the energy distribution of the colored lights entering the light-homogenizing element still may not be effectively controlled.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a beam-splitting element that may control the angular distribution of a passing beam.

The invention provides a projection device that may provide an image with good uniformity.

Other objects and advantages of the invention may be further understood from the technical features disclosed by the invention.

In order to achieve one or part or all of the above objects or other objects, an embodiment of the invention provides a beam-splitting element. The beam-splitting element has a first region and a second region, and the beam-splitting element includes a first pattern film and a second pattern film. The first pattern film is located on the second region and is configured to allow a light beam with an emission wavelength within a first waveband range to penetrate. The second pattern film is located on the second region and is configured to reflect the light beam with the emission wavelength within the first waveband range. The first pattern film and the second pattern film are not overlapped with each other, and the first pattern film and the second pattern film form a beam-splitting pattern together on the second region, wherein a ratio of an area of the first pattern film occupied in the second region is between 30% and 70%.

In order to achieve one or part or all of the above objects or other objects, an embodiment of the invention provides a projection device. The projection device includes an illumination system, a light valve, and a projection lens. The illumination system is configured to provide an illumination beam, and includes a laser light source unit, a beam-splitting element, and a wavelength conversion module. The laser light source unit is configured to provide a laser beam. The beam-splitting element is located on a transmission path of the laser beam. The wavelength conversion module has wavelength conversion regions and non-conversion regions configured to rotate around an axis of rotation so that the wavelength conversion regions and the non-conversion regions alternately cut into the transmission path of the laser beam. The light valve is disposed on the transmission path of the illumination beam from the illumination system, and is configured to convert the illumination beam into an image beam. The projection lens is disposed on the transmission path of the image beam and is configured to project the image beam out of the projection device.

Based on the above, the embodiments of the invention have at least one of the following advantages or effects. In an embodiment of the invention, via the configuration of the first pattern film or the second pattern film, the beam-splitting element may control the profile of the beam-splitting pattern and the ratio of the area of the first pattern film or the second pattern film occupied in the second region to control the position and ratio of the first sub-laser beam and the second sub-laser beam leaving the beam-splitting element so as to control the angle and the energy distribution of the first sub-laser beam and the second sub-laser beam entering the light-homogenizing element, thereby optimizing the image uniformity. In addition, the uniformity of the first sub-laser beam and the second sub-laser beam may be further improved via the configuration of a diffusion layer of the beam-splitting element. In this way, the projection device adopting the beam-splitting element is able to provide a uniformly colored image, thereby improving the image quality and the visual perception of the user.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
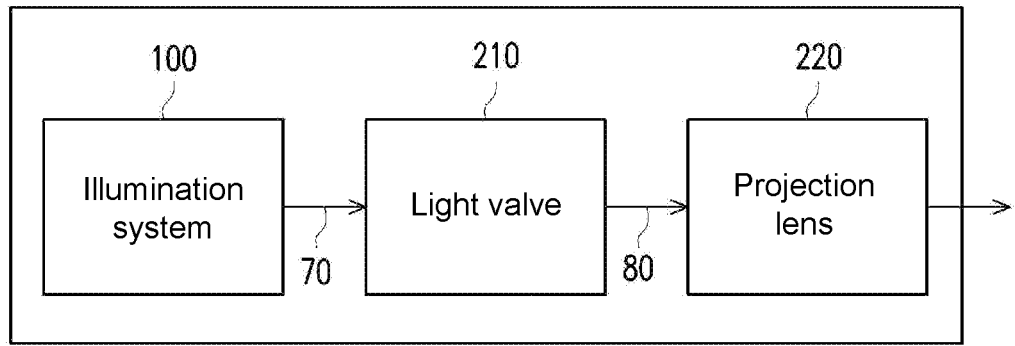
FIG. 1 is a block diagram of a projection device of an embodiment of the invention.

FIG. 1 is a block diagram of a projection device of an embodiment of the invention. Please refer to FIG. 1, a projection device 200 includes an illumination system 100, a light valve 210, and a projection lens 220. The illumination system 100 is configured to provide an illumination beam 70. The light valve 210 is disposed on the transmission path of the illumination beam 70 from the illumination system 100, and is configured to convert the illumination beam 70 into an image beam 80. The projection lens 220 is disposed on the transmission path of the image beam 80 and is configured to project the image beam 80 out of the projection device 200. In the embodiment, the number of the light valve 210 is one, but the invention is not limited thereto. In other embodiments, the number of the light valve 210 may also be a plurality. Moreover, in the embodiment, the light valve 210 may be a digital micro-mirror device (DMD) or a liquid-crystal-on-silicon (LCOS) panel. However, in other embodiments, the light valve 210 may also be a transmissive liquid-crystal panel or other beam modulators.

Figure 2A:
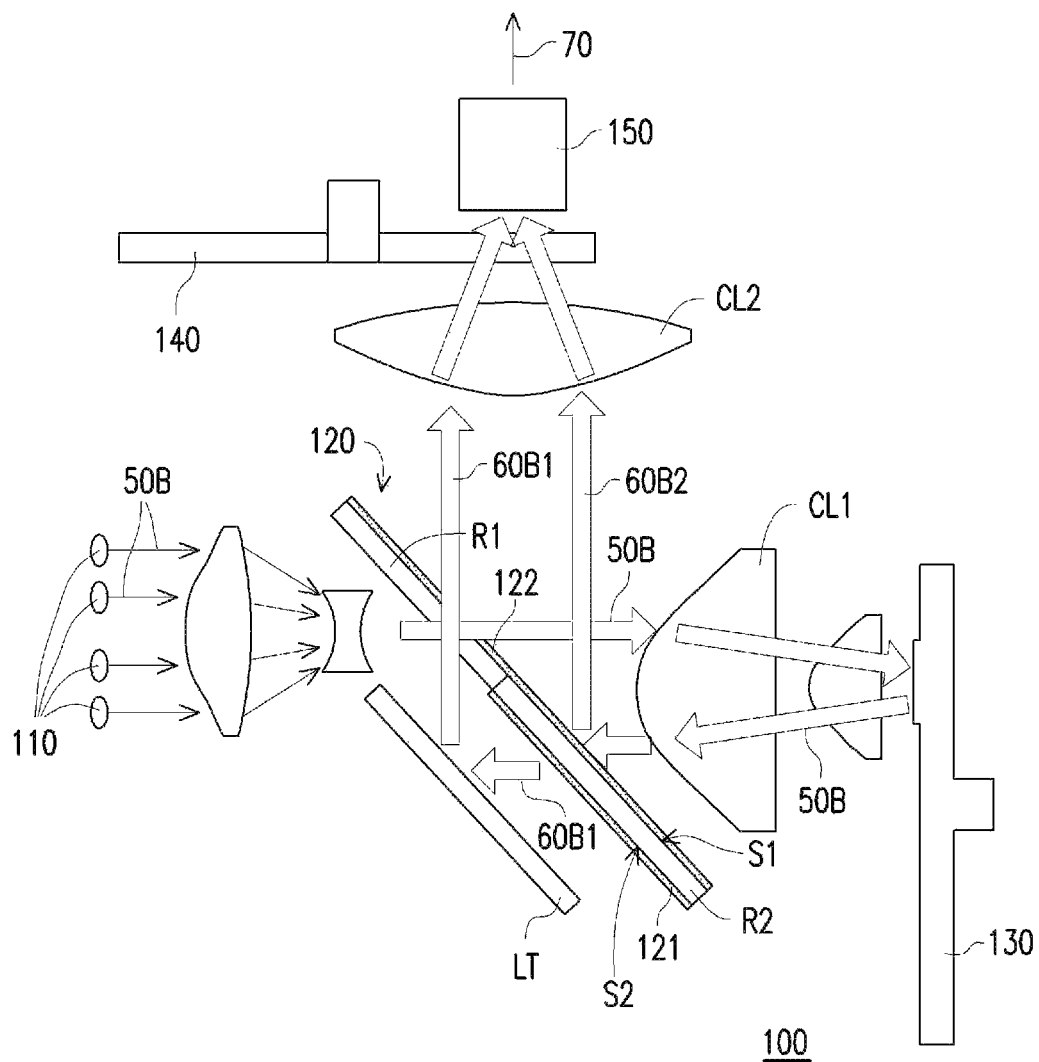
FIG. 2A is a diagram of the optical path of the laser beam of the illumination system of FIG. 1.
Figure 2B:
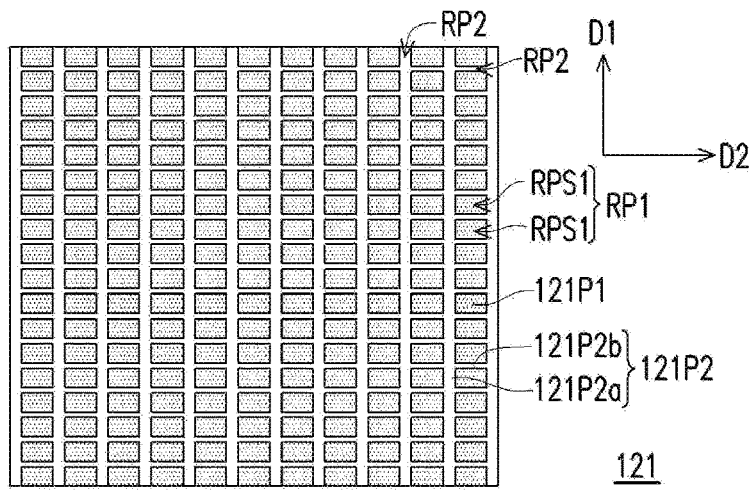
FIG. 2B is a diagram of the beam-splitting pattern of the beam-splitting element of FIG. 2A.
Figure 2C:
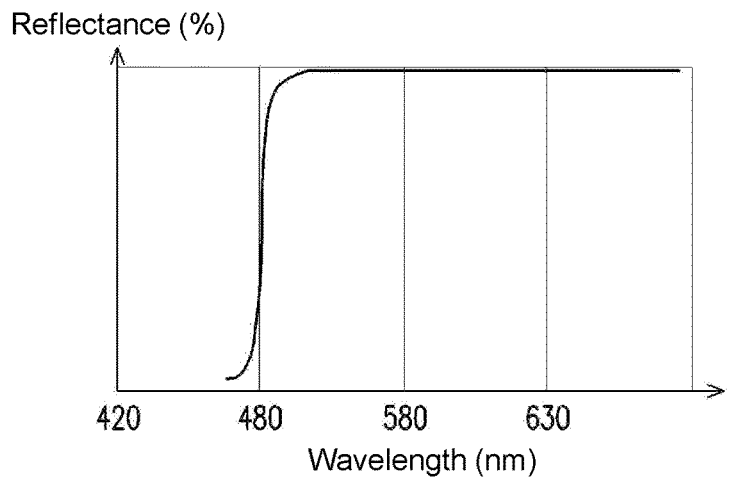
FIG. 2C is a graph showing the relationship between the reflectance of the first pattern film of FIG. 2A to light of different wavebands.
Figure 2D:
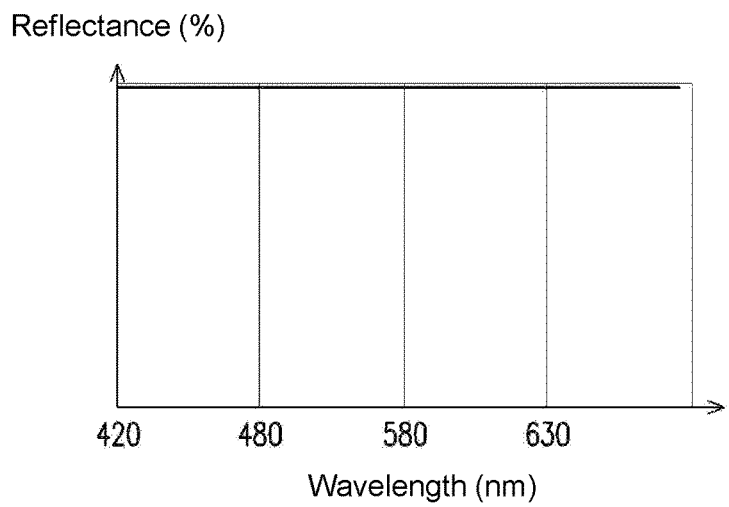
FIG. 2D is a graph showing the relationship between the reflectance of the second pattern film of FIG. 2A to light of different wavebands.
Figure 2E:
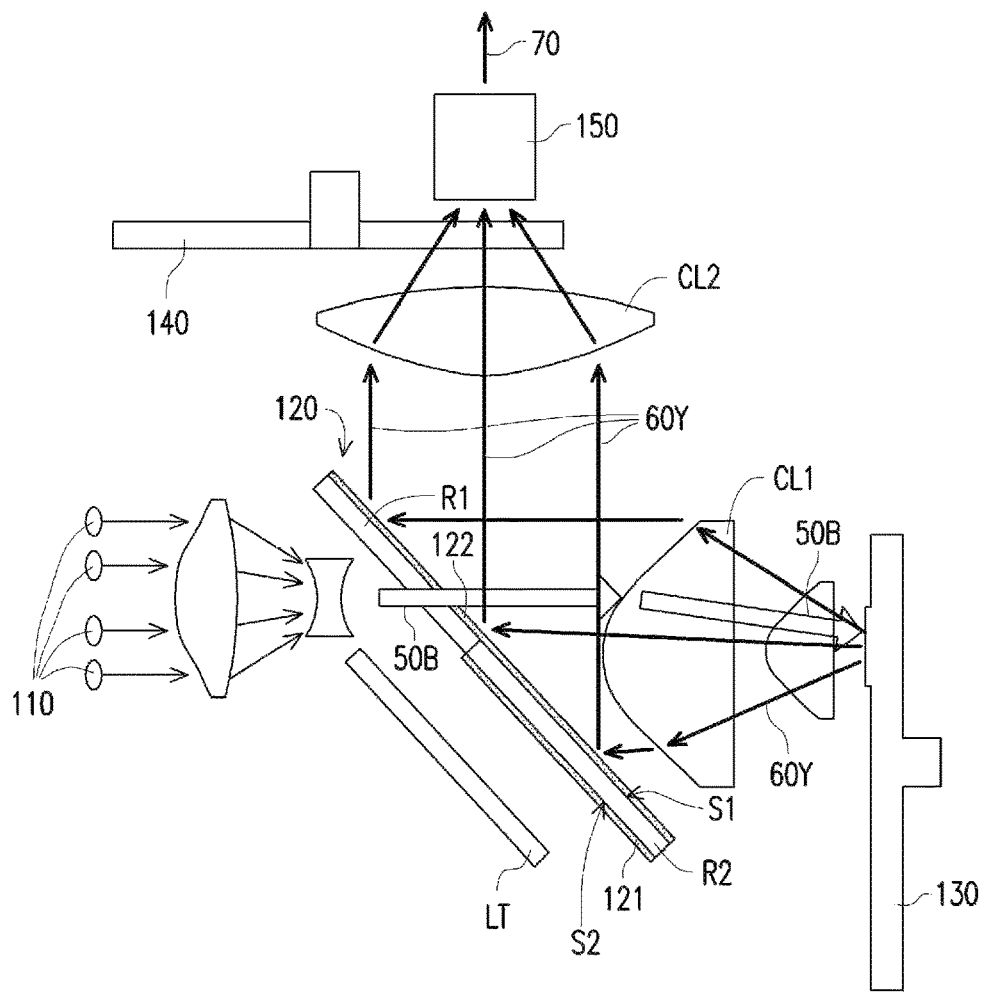
FIG. 2E is a diagram of the optical path of the wavelength conversion beam of the illumination system of FIG. 2A.
Figure 2F:
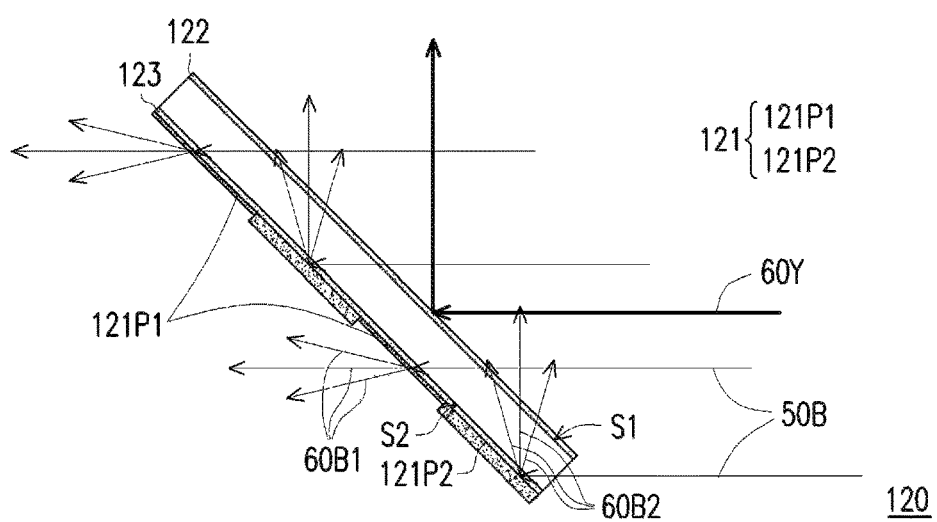
FIG. 2F is a side view of the beam-splitting element of FIG. 2A.

FIG. 2A is a diagram of the optical path of the laser beam of the illumination system of FIG. 1. FIG. 2B is a diagram of the beam-splitting pattern of the beam-splitting element of FIG. 2A. FIG. 2C is a graph showing the relationship between the reflectance of the first pattern film of FIG. 2A to light of different wavebands. FIG. 2D is a graph showing the relationship between the reflectance of the second pattern film of FIG. 2A to light of different wavebands. FIG. 2E is a diagram of the optical path of the wavelength conversion beam of the illumination system of FIG. 2A. FIG. 2F is a side view of the beam-splitting element of FIG. 2A. Specifically, as shown in FIG. 2A, in the embodiment, the illumination system 100 includes a laser light source unit 110, a beam-splitting element 120, a wavelength conversion module 130, a first condenser lens CL1, a light transmission module LT, a light filter module 140, a second condenser lens CL2, and a light-homogenizing element 150. Specifically, in the embodiment, the beam-splitting element 120 has a first region R1 and a second region R2. For example, the first region R1 and the second region R2 of the beam-splitting element 120 may have different optical effects on light beams in different waveband ranges. Description is provided below with FIGS. 2A to 2D.

For example, as shown in FIG. 2A, FIG. 2B, and FIG. 2E, in the embodiment, the beam-splitting element 120 has a first surface S1 and a second surface S2 opposite to each other, and the beam-splitting element 120 includes a beam-splitting pattern 121 and a beam-splitting film 122. Specifically, as shown in FIG. 2A and FIG. 2E, the beam-splitting film 122 is located on the first surface S1 and at least partially covers the first region R1 and the second region R2, and the beam-splitting pattern 121 is located on the second surface S2 and only covers the second region R2.

More specifically, as shown in FIG. 2B to FIG. 2D, in the embodiment, the beam-splitting element 120 includes a first pattern film 121P1 and a second pattern film 121P2. The first pattern film 121P1 and the second pattern film 121P2 are both located on the second region R2 of the beam-splitting element 120. The first pattern film 121P1 and the second pattern film 121P2 are not overlapped with each other, and the first pattern film 121P1 and the second pattern film 121P2 form the beam-splitting pattern 121 of the beam-splitting element 120 together on the second region R2. For example, in the embodiment, the beam-splitting pattern 121 may be made via a photomask process, and the first pattern film 121P1 may be coated on the second region R2 of the beam-splitting element 120 first, and then a photomask may be applied on the second region R2, wherein the region covered by the photomask is a first pattern region RP1, and the part not covered by the photomask is a second pattern region RP2. Then, another coating process is performed, wherein a reflective film is coated on the part not covered by the photomask (i.e., the second pattern region RP2). In other words, as shown in FIG. 2B to FIG. 2D, the second region R2 includes the first pattern region RP1 and the second pattern region RP2. The first pattern film 121P1 is located on the first pattern region RP1, and the second pattern film 121P2 is located on the second pattern region RP2. In this way, the beam-splitting pattern 121 formed by the first pattern film 121P1 and the second pattern film 121P2 may be formed.

Moreover, as shown in FIG. 2C, in the embodiment, the first pattern film 121P1 is configured to allow a light beam with an emission wavelength within a first waveband range to penetrate and reflect a light beam with an emission wavelength outside the first waveband range. As shown in FIG. 2D, in the embodiment, the second pattern film 121P2 is configured to reflect a light beam with an emission wavelength within the full waveband range of visible light. In more detail, as shown in FIG. 2C and FIG. 2D, in the embodiment, the first waveband range is, for example, a waveband range in which the main emission wavelength is less than 480 nanometers. In other words, the first pattern film 121P1 and the second pattern film 121P2 forming the beam-splitting pattern 121 may also provide different optical functions for a blue beam, so that a part of the blue beam passing through the beam-splitting pattern 121 may penetrate the beam-splitting pattern 121 (the first pattern film 121P1) and another part thereof may be reflected by the beam-splitting pattern 121 (the second pattern film 121P2), and the penetration or reflection of the beam-splitting pattern 121 may be determined based on the ratio of the area of the first pattern film 121P1 occupied in the second region R2. For example, in the embodiment, the ratio of the area of the first pattern film 121P1 occupied in the second region R2 is between 30% and 70%.

More specifically, as shown in FIG. 2B, the first pattern region RP1 has a plurality of first sub-pattern regions RPS1, and each of the plurality of first sub-pattern regions RPS1 is respectively surrounded by the second pattern region RP2. More specifically, as shown in FIG. 2B, the second pattern film 121P2 has a plurality of first sub-strip patterns 121P2*a* and a plurality of second sub-strip patterns 121P2*b*, the first sub-strip patterns 121P2*a* are extended along a first direction D1, and the second sub-strip patterns 121P2*b* are extend along a second direction D2. As a result, the beam-splitting pattern 121 formed by the first pattern film 121P1 and the second pattern film 121P2 on the second region R2 may be a checkerboard pattern. However, the invention is not limited thereto. In other embodiments, different profiles of the first pattern region RP1 and the second pattern region RP2 may also be configured via photomasks with different profiles to form different styles of the beam-splitting pattern 121.

Moreover, in the embodiment, the beam-splitting film 122 is configured to allow a light beam with an emission wavelength within a first waveband range to penetrate and reflect a light beam with an emission wavelength within a second waveband range, wherein the first waveband range is different from the second waveband range. For example, in the embodiment, the first waveband range is a waveband range in which the main emission wavelength is less than 480 nanometers as described above, and the second waveband range is a waveband range in which the main emission wavelength is greater than 480 nanometers. In other words, in the embodiment, the beam-splitting film 122 may allow blue light to penetrate, and reflect colored lights other than blue light.

As a result, under the above configuration, in the embodiment, since the first region R1 of the beam-splitting element 120 is only provided with the beam-splitting film 122, the first region R1 of the beam-splitting element 120 may be a dichroic mirror with a blue light penetrating function to allow blue light to penetrate and reflect colored lights other than blue light. Moreover, since the second region R2 of the beam-splitting element 120 is also provided with the first pattern film 121P1 and the second pattern film 121P2 forming the beam-splitting pattern 121, in addition to reflecting light beams other than blue light, a part of the blue beam passing through the beam-splitting pattern 121 may penetrate the beam-splitting pattern 121 and another part thereof may be reflected by the beam-splitting pattern 121, and the penetration or reflection of the beam-splitting pattern 121 may be determined based on the ratio of the area of the first pattern film 121P1 occupied in the second region R2.

As a result, via the configuration of the first pattern film 121P1, the second pattern film 121P2, and the beam-splitting film 122 of the beam-splitting element 120, the projection device 200 may further control the angle and the energy distribution of a light beam entering a light-homogenizing element to improve the uniformity of the image. Description is provided below with FIG. 2A and FIG. 2E.

Specifically, as shown in FIG. 2A and FIG. 2E, in the embodiment, the laser light source unit 110 is configured to provide a laser beam 50B. For example, in the embodiment, the laser beam 50B is a blue laser beam, and the laser light source unit 110 may include a plurality of blue laser diodes arranged in an array, but the invention is not limited thereto. Since the first region R1 of the beam-splitting element 120 may allow blue light to penetrate and reflect colored lights other than blue light, the first region R1 of the beam-splitting element 120 may allow the blue laser beam 50B to penetrate, and the laser beam 50B may be transmitted to a subsequent optical element via the first region R1 of the beam-splitting element 120.

Moreover, as shown in FIG. 2A and FIG. 2E, in the embodiment, the beam-splitting element 120 is located on the transmission path of the laser beam 50B, and the first condenser lens CL1 is located on the transmission path of the laser beam 50B and located between the beam-splitting element 120 and the wavelength conversion module 130. Therefore, when the laser beam 50B penetrates the first region R1 of the beam-splitting element 120, the laser beam 50B may be incident on the wavelength conversion module 130 obliquely via the first condenser lens CL1. More specifically, in the embodiment, the wavelength conversion module 130 has wavelength conversion regions (not shown) and non-conversion regions (not shown) configured to rotate around an axis of rotation so that the wavelength conversion regions and the non-conversion regions of the wavelength conversion module 130 alternately cut into the transmission path of the laser beam 50B.

More specifically, in the embodiment, the wavelength conversion regions of the wavelength conversion module 130 are formed by a wavelength conversion layer (not shown), and may be configured to convert the passing laser beam 50B into a wavelength conversion beam 60Y. For example, in the embodiment, the wavelength conversion material on the wavelength conversion layer includes a phosphor that may be excited to provide a yellow beam, so the wavelength conversion beam 60Y formed after the laser beam 50B is incident on the wavelength conversion layer is yellow light. Moreover, in the embodiment, the non-conversion regions of the wavelength conversion module 130 are respectively formed by a reflective layer. In other words, in the embodiment, at least one non-conversion region may reflect the laser beam 50B and enable the laser beam 50B to be transmitted to a subsequent optical element.

More specifically, as shown in FIG. 2A, when the non-conversion regions of the wavelength conversion module 130 cut into the transmission path of the laser beam 50B, the laser beam 50B sequentially passes through the first region R1 of the beam-splitting element 120 and the first condenser lens CL1, and then obliquely enters the non-conversion regions of the wavelength conversion module 130, and after being reflected by the non-conversion regions, the laser beam 50B is transmitted to the second region R2 of the beam-splitting element 120 via the first condenser lens CL1. Therefore, as shown in FIG. 2A and FIG. 2B, since the second region R2 of the beam-splitting element 120 is provided with the first pattern region RP1 and the second pattern region RP2, and the first pattern film 121P1 provided in the first pattern region RP1 and the second pattern film 121P2 provided in the second pattern region RP2 provide different optical functions for a blue beam, when the laser beam 50B is transmitted to the beam-splitting element 120 via the non-conversion regions of the wavelength conversion module 130, a part of the laser beam 50B (blue light) penetrates the first pattern film 121P1 of the beam-splitting element 120 to form a first sub-laser beam 60B1, and another part of the laser beam 50B (blue light) is reflected by the second pattern film 121P2 of the beam-splitting element 120 to form a second sub-laser beam 60B2.

More specifically, as shown in FIG. 2A, in the embodiment, the light transmission module LT is located on the transmission path of the first sub-laser beam 60B1 from the first pattern film 121P1 of the beam-splitting element 120, and the second condenser lens CL2 is located between the beam-splitting element 120 and the light filter module 140. For example, in the embodiment, the light transmission module LT may be a reflective element or a dichroic mirror, and may be configured to reflect the first sub-laser beam 60B1 to the first region R1 of the beam-splitting element 120. Therefore, as shown in FIG. 2A, in the embodiment, the first sub-laser beam 60B1 is transmitted to the first region R1 of the beam-splitting element 120 via the light transmission module LT and is transmitted to the second condenser lens CL2 after penetrating the beam-splitting element 120. After the laser beam 50B is formed, the laser beam 50B is directly transmitted to the second condenser lens CL2, and the first sub-laser beam 60B1 and the second sub-laser beam 60B2 are transmitted to the light filter module 140 after being respectively symmetrically and obliquely incident on the second condenser lens CL2 from both sides of the second condenser lens CL2.

Moreover, as shown in FIG. 2E, in the embodiment, when the wavelength conversion regions of the wavelength conversion module 130 cut into the transmission path of the laser beam 50B, the laser beam 50B is incident on the wavelength conversion regions of the wavelength conversion module 130 to be converted into the wavelength conversion beam 60Y. Moreover, the wavelength conversion beam 60Y reflected by the wavelength conversion regions is uniformly transmitted to the beam-splitting element 120 via the first condenser lens CL1, and since the first surfaces S1 in the first region R1 and the second region R2 of the beam-splitting element 120 are both provided with the beam-splitting film 122, the beam-splitting film 122 may be configured to allow the laser beam 50B to penetrate and reflect the wavelength conversion beam 60Y. Therefore, the beam-splitting element 120 may be configured to reflect the wavelength conversion beam 60Y and transmit the wavelength conversion beam 60Y to the second condenser lens CL2, so that the wavelength conversion beam 60Y may be symmetrically incident on the light filter module 140 via the second condenser lens CL2.

Next, as shown in FIG. 2A and FIG. 2E, in the embodiment, the light filter module 140 is located on the transmission path of the first sub-laser beam 60B1, the second sub-laser beam 60B2, and the wavelength conversion beam 60Y, and the light filter module 140 has a light filter optical region (not shown) and a light transmission region (not shown). The light filter module 140 also includes a second actuator (not shown) configured to make the light filter optical region (not shown) correspondingly cut into the irradiation range of the wavelength conversion beam 60Y at different times to respectively form red colored light and green colored light. Moreover, the light transmission region (not shown) also correspondingly cuts into the irradiation range of the first sub-laser beam 60B1 and the second sub-laser beam 60B2 transmitted to the light filter module 140 at different times to form blue colored light. In this way, the first sub-laser beam 60B1, the second sub-laser beam 60B2, and the wavelength conversion beam 60Y pass through the light filter module 140 sequentially to form the illumination beam 70 having a plurality of different colors.

Moreover, as shown in FIG. 2A and FIG. 2E, in the embodiment, the projection device 200 further includes the light-homogenizing element 150 located on the transmission path of the illumination beam 70 formed after passing through the light filter module 140. In the embodiment, the light-homogenizing element 150 includes an integrating rod, but the invention is not limited thereto. More specifically, as shown in FIG. 2, when the blue colored light formed by the first sub-laser beam 60B1 and the second sub-laser beam 60B2 in the illumination beam 70 and the green colored light and the red colored light formed by the wavelength conversion beam 60Y are transmitted to the light-homogenizing element 150, the light-homogenizing element 150 may homogenize the colored lights and transmit them to the light valve 210.

Moreover, in the embodiment, the profile of the beam-splitting pattern 121 and the positions of the first pattern film 121P1 and the second pattern film 121P2 of the beam-splitting element 120 and the ratio of the areas thereof occupied in the second region R2 may determine the positions at which the first sub-laser beam 60B1 and the second sub-laser beam 60B2 are incident on the second condenser lens CL2 and the incident angle at which the first sub-laser beam 60B1 and the second sub-laser beam 60B2 are transmitted to the light filter module 140. Therefore, by controlling the profile of the beam-splitting pattern 121 and the ratio of the area of the first pattern film 121P1 or the second pattern film 121P2 occupied in the second region R2, the positions and the ratios of the first sub-laser beam 60B1 and the second sub-laser beam 60B2 leaving the beam-splitting element 120 may be further controlled so as to control the angle and the energy distribution of the first sub-laser beam 60B1 and the second sub-laser beam 60B2 entering the light-homogenizing element, thereby optimizing the image uniformity.

In addition, as shown in FIG. 2F, in the embodiment, the beam-splitting element 120 may optionally include a diffusion layer 123, and the diffusion layer 123 is located on the second surface S2 and at least covers the second region R2. As shown in FIG. 2F, the diffusion layer 123 is located between the beam-splitting pattern 121 and the beam-splitting film 122, and the first surface S1 of the beam-splitting element 120 provided with the beam-splitting film 122 faces the wavelength conversion module 130. Therefore, when the laser beam 50B from the wavelength conversion module 130 passes through the beam-splitting element 120, after being diffused by the diffusion layer 123, the laser beam 50B may penetrate the beam-splitting pattern 121 respectively via the beam-splitting pattern 121 or be reflected to respectively form the first sub-laser beam 60B1 and the second sub-laser beam 60B2. In addition, when the wavelength conversion beam 60Y passes through the beam-splitting element 120, the wavelength conversion beam 60Y may be directly reflected by the beam-splitting film 122 located at the first surface S1 of the beam-splitting element 120 without being affected by the diffusion layer 123. In this way, the uniformity of the first sub-laser beam 60B1 and the second sub-laser beam 60B2 may be further improved, without affecting the reflection of the wavelength conversion beam 60Y.

In addition, in the embodiment, the plate body and the diffusion layer 123 of the beam-splitting element 120 are exemplified in the shape of a flat plate, but the invention is not limited thereto. In other embodiments, the beam-splitting element 120 may also include a microlens array to further adjust the uniformity of the first sub-laser beam 60B1 and the second sub-laser beam 60B2 to achieve similar functions, which is not repeated herein.

Therefore, via the configuration of the first pattern film 121P1 or the second pattern film 121P2, the beam-splitting element 120 may control the profile of the beam-splitting pattern 121 and the ratio of the area of the first pattern film 121P1 or the second pattern film 121P2 occupied in the second region R2 to control the positions and the ratios of the first sub-laser beam 60B1 and the second sub-laser beam 60B2 leaving the beam-splitting element 120 so as to control the angle and the energy distribution of the first sub-laser beam 60B1 and the second sub-laser beam 60B2 entering the light-homogenizing element, thereby optimizing the image uniformity. In addition, the uniformity of the first sub-laser beam 60B1 and the second sub-laser beam 60B2 may be further improved via the configuration of the diffusion layer 123 of the beam-splitting element 120. In this way, the projection device 200 adopting the beam-splitting element 120 is able to provide a uniformly colored image, thereby improving the image quality and the visual perception of the user.

It is worth noting that in the foregoing embodiments, although the beam-splitting pattern 121 of the beam-splitting element 120 is exemplified by a checkerboard pattern, the invention is not limited thereto. In other embodiments, different profiles of the first pattern region RP1 and the second pattern region RP2 may also be configured via photomasks with different profiles to form different styles of the beam-splitting pattern 121. Description is provided below with FIGS. 3A to 3F.

Figure 3A:
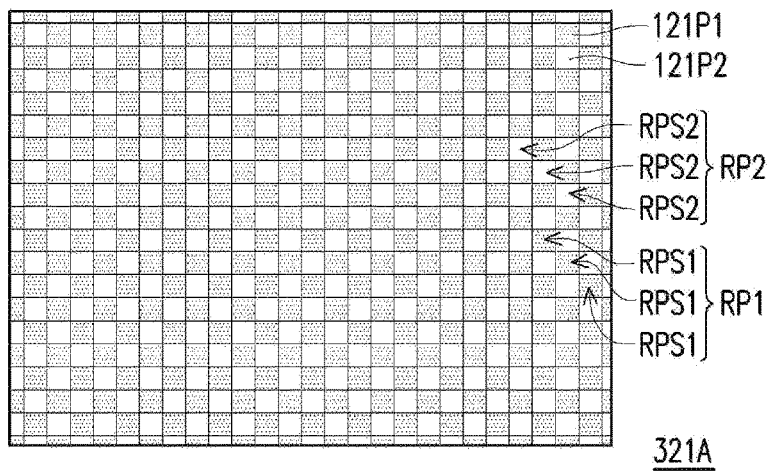
FIG. 3A to FIG. 3F are diagrams of different beam-splitting patterns of the beam-splitting element of FIG. 2A.
Figure 3B:
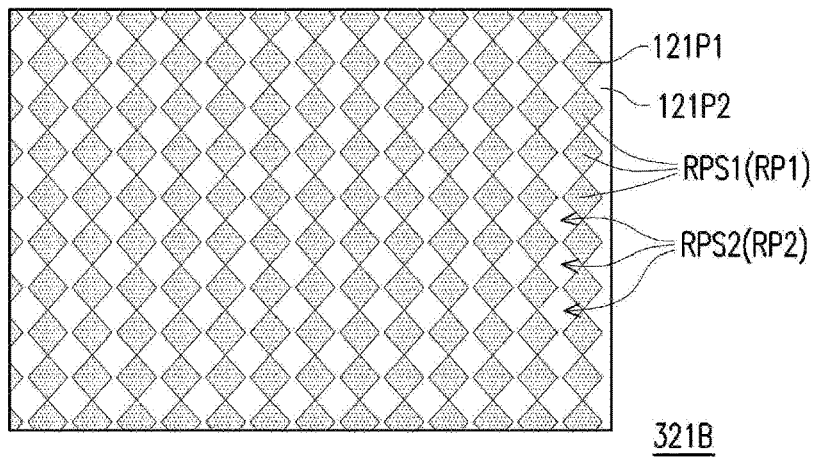
Figure 3C:
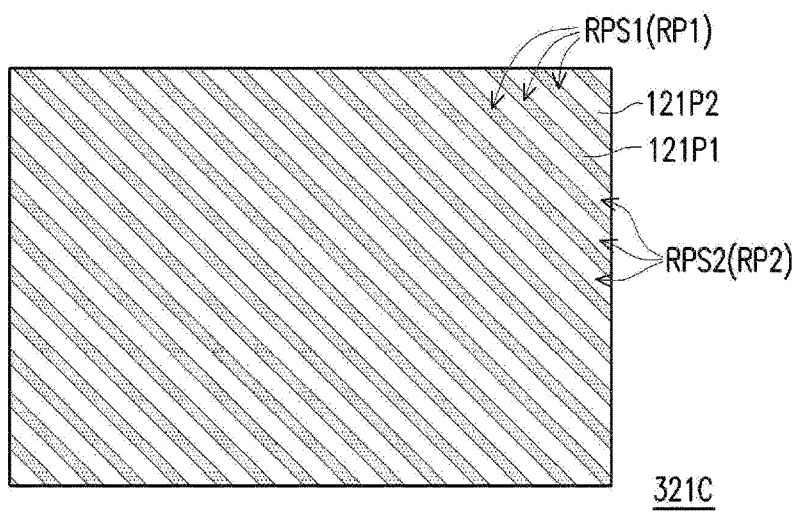
Figure 3D:
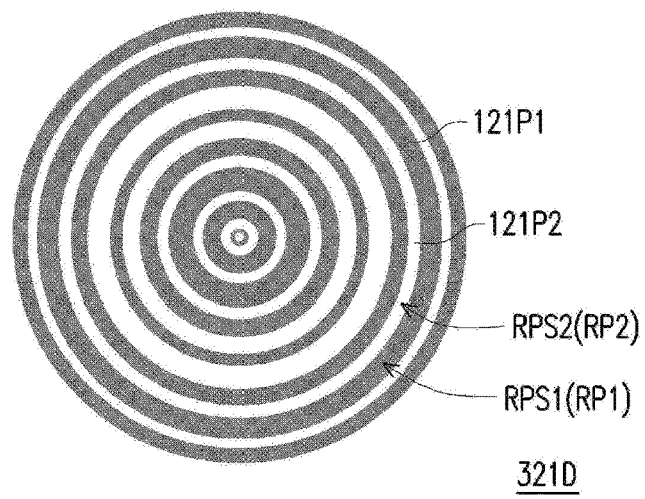
Figure 3E:
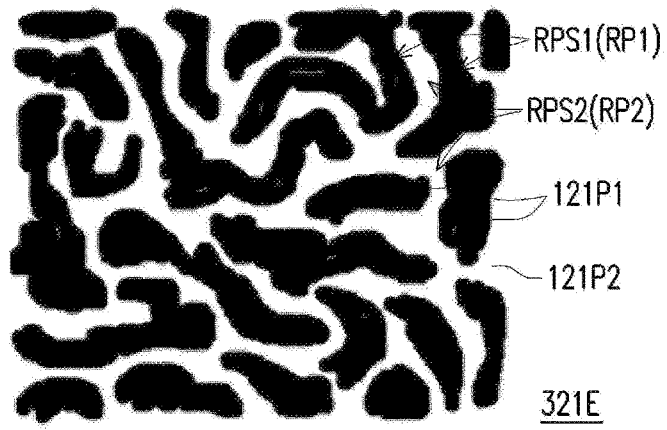
Figure 3F:
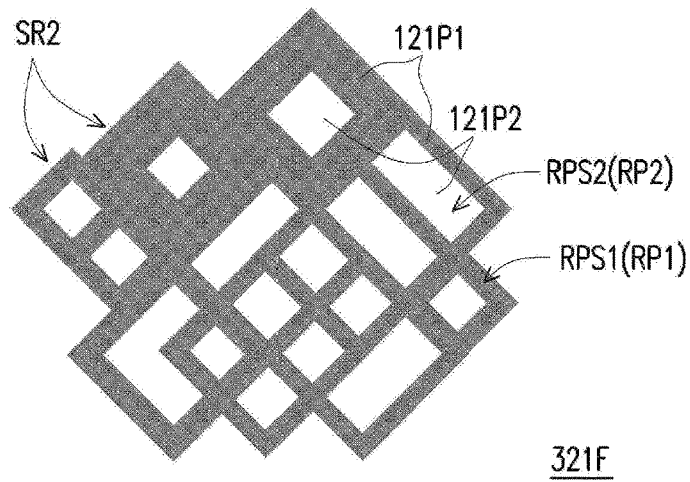

FIG. 3A to FIG. 3F are diagrams of different beam-splitting patterns 121 of the beam-splitting element 120 of FIG. 2A. Please refer to FIG. 3A to FIG. 3F. Beam-splitting patterns 321A, 321B, 321C, 321D, 321E, and 321F of FIG. 3A to FIG. 3F are similar to the beam-splitting pattern 121 of FIG. 2B, and the differences are as follows. In the embodiment of FIG. 3A to FIG. 3F, the first pattern region RP1 of the beam-splitting patterns 321A, 321B, 321C, 321D, and 321E has the plurality of first sub-pattern regions RPS1, and the second pattern region RP2 has the plurality of second sub-pattern regions RPS2. In the embodiment of FIG. 3F, the second region R2 of the beam-splitting pattern 321F includes a plurality of second sub-regions SR2, and each of the second sub-regions SR2 includes a first sub-pattern region RPS1 provided with the first pattern film 121P1 and a second sub-pattern region RPS2 provided with the second pattern film 121P2.

More specifically, in the embodiment of FIG. 3A and FIG. 3B, each of the plurality of first sub-pattern regions RPS1 and each of the plurality of second sub-pattern regions RPS2 of the beam-splitting pattern 321A and the beam-splitting pattern 321B have a rectangular shape (as shown in FIG. 3A) or a diamond shape (as shown in FIG. 3B), and are arranged alternately in a staggered manner. Therefore, the beam-splitting pattern 321A and the beam-splitting pattern 321B of the first pattern film 121P1 provided in the first pattern region RP1 and the second pattern film 121P2 provided in the second pattern area RP2 formed on the second area R2 may be similar to a chessboard pattern.

In the embodiment of FIG. 3C to FIG. 3E, the first sub-pattern regions RPS1 of the beam-splitting patterns 321C, 321D, and 321E are all formed in a strip shape. Moreover, in the embodiment of FIG. 3C, each of the second sub-pattern regions RPS2 of the beam-splitting pattern 321C also has a strip shape, any first sub-pattern region RPS1 is located between two adjacent second sub-pattern regions RPS2, and the extending direction of each of the first sub-pattern regions RPS1 is the same as the extending direction of each of the second sub-pattern regions RPS2. In the embodiment of FIG. 3D, the second sub-pattern regions RPS2 of the beam-splitting pattern 321D also have a strip shape, but the first pattern region RP1 and the second pattern region RP2 are extended in a spiral direction around a center to form a swirling pattern. In the embodiment of FIG. 3E, each of the second sub-pattern regions RPS2 of the beam-splitting pattern 321E may have an irregular shape, and determined based on the distribution of each of the first sub-pattern regions RPS1, and as shown in FIG. 3E, any first sub-pattern region RPS1 is located between two adjacent second sub-pattern regions RPS2, and each of the first sub-pattern regions RPS1 and each of the second sub-pattern regions RPS2 may be randomly distributed.

In the embodiment of FIG. 3F, the second region R2 of the beam-splitting pattern 321F includes the plurality of second sub-regions SR2, and each of the second sub-regions SR2 includes a first sub-pattern region RPS1 provided with the first pattern film 121P1 and a second sub-pattern region RPS2 provided with the second pattern film 121P2. In addition, the first sub-pattern regions RPS1 and the second sub-pattern regions RPS2 in different second sub-regions SR2 may also be different from each other.

Therefore, when the beam-splitting element 120 adopts the above beam-splitting patterns 321A, 321B, 321C, 321D, and 321E, via the configuration of the profile of the beam-splitting patterns 321A, 321B, 321C, 321D, and 321E and the ratio of the area of the first pattern film 121P1 or the second pattern film 121P2 occupied in the second region R2, the beam-splitting element 120 may also adjust the positions and ratios of the first sub-laser beam 60B1 and the second sub-laser beam 60B2 leaving the beam-splitting element 120 to achieve the above effects and advantages, which are not repeated herein. Therefore, when the projection device 200 adopts the beam-splitting element 120 having the beam-splitting patterns 321A, 321B, 321C, 321D, and 321E, the above effects and advantages may also be achieved, which are not repeated herein.

Figure 4A:
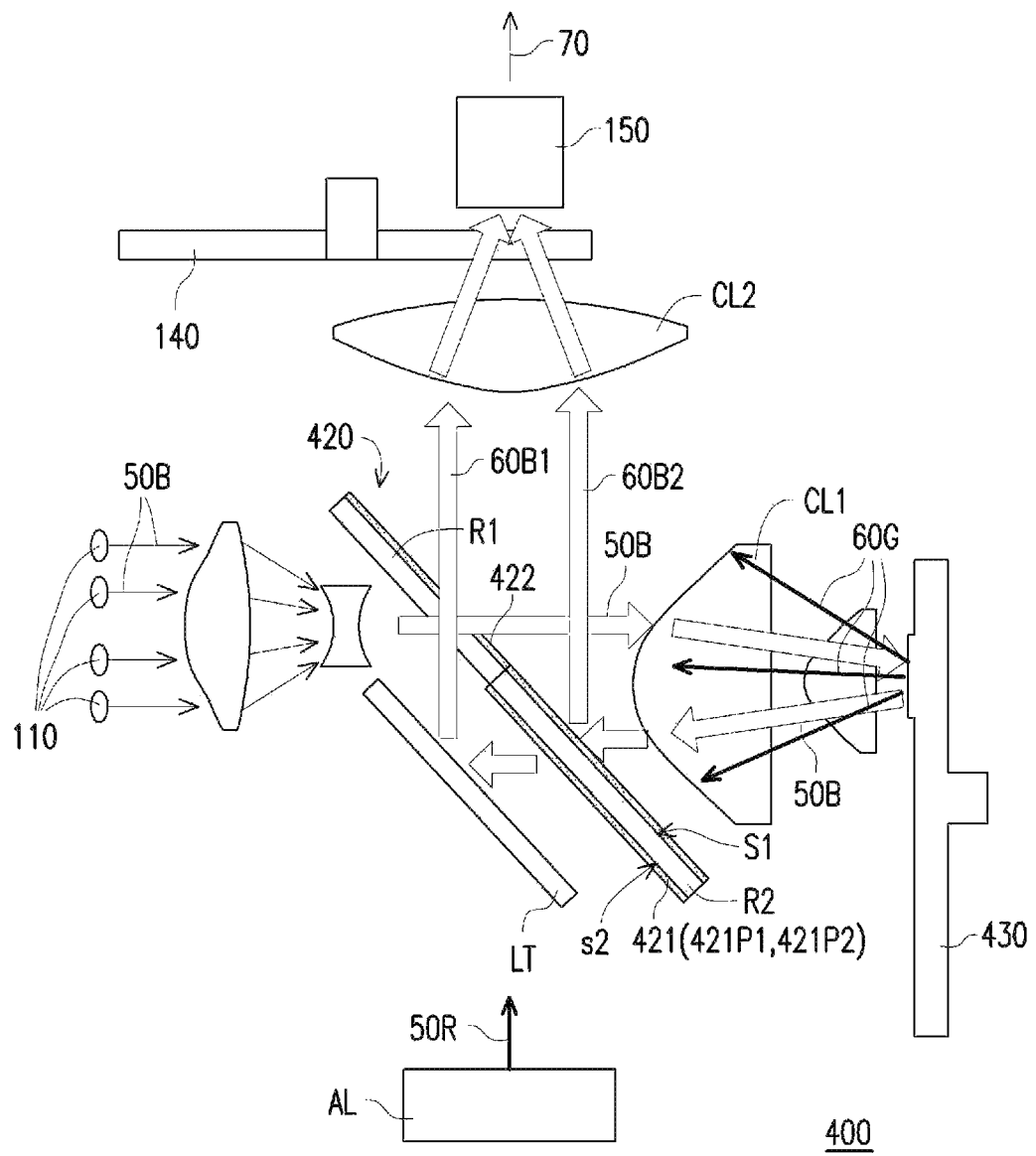
FIG. 4A is a diagram of the optical path of the auxiliary beam of another illumination system of FIG. 1.
Figure 4B:
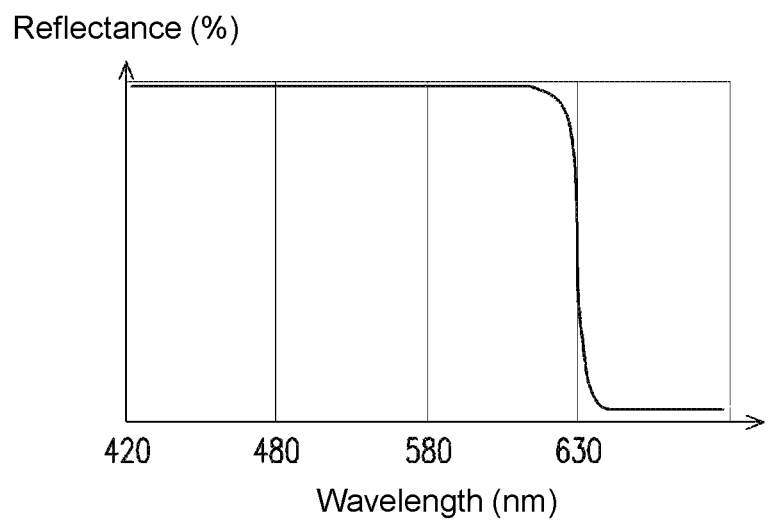
FIG. 4B is a graph showing the relationship between the reflectance of the first pattern film of FIG. 2A to light of different wavebands.
Figure 4C:
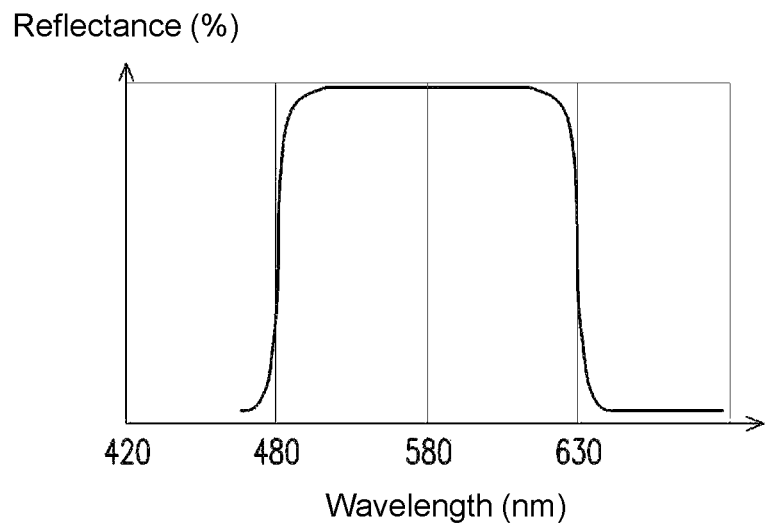
FIG. 4C is a graph showing the relationship between the reflectance of the second pattern film of FIG. 2A to light of different wavebands.

FIG. 4A is a diagram of the optical path of the auxiliary beam of another illumination system of FIG. 1. FIG. 4B is a graph showing the relationship between the reflectance of the first pattern film of FIG. 2A to light of different wavebands. FIG. 4C is a graph showing the relationship between the reflectance of the second pattern film of FIG. 2A to light of different wavebands. Please refer to FIG. 4A to FIG. 4C. An illumination system 400 of FIG. 4A is similar to the illumination system 100 of FIG. 2A, and the differences are as follows. As shown in FIG. 4A, in the embodiment, the illumination system 400 further includes an auxiliary light source AL configured to provide an auxiliary beam 50R, wherein the light transmission module LT is located between the auxiliary light source AL and the light filter module 140. For example, in the embodiment, the auxiliary light source AL may be a red laser light source or a red light-emitting diode light source, and the auxiliary beam 50R is a red beam. More specifically, in the embodiment, the light transmission module LT is a dichroic mirror that allows a light beam with an emission wavelength within a third waveband range to penetrate and reflects a light beam with an emission wavelength outside the third waveband range. The third waveband range is, for example, a waveband range in which the main emission wavelength is greater than 630 nanometers. In this way, the light transmission module LT may allow the red auxiliary beam 50R to penetrate.

Moreover, as shown in FIG. 4A, in the embodiment, the wavelength conversion material on the wavelength conversion layer of a wavelength conversion module 430 includes a phosphor that may be excited to provide a green beam, so a wavelength conversion beam 60G formed by the laser beam 50B is green light. Moreover, in the embodiment, a beam-splitting film 422 is configured to allow a light beam with an emission wavelength falling within a first waveband range and a third waveband range to penetrate and reflect a light beam with an emission wavelength falling within a second waveband range. For example, in the embodiment, the second waveband range is, for example, the waveband range of the main emission wavelength between 480 nanometers and 630 nanometers. In other words, in the embodiment, the beam-splitting film 422 may allow blue light and red light to penetrate and reflect green light.

Moreover, as shown in FIG. 4B and FIG. 4C, in the embodiment, a first pattern film 421P1 and a second pattern film 421P2 are similar to the first pattern film 121P1 and the second pattern film 121P2, respectively, and the differences are as follows. As shown in FIG. 4B, in the embodiment, the first pattern film 421P1 is configured to allow a light beam with an emission wavelength within the first waveband range and the third waveband range to penetrate and reflect a light beam with an emission wavelength outside the first waveband range and the third waveband range. As shown in FIG. 4C, in the embodiment, the second pattern film 421P2 is configured to allow a light beam with an emission wavelength within the third waveband range to penetrate and reflect a light beam with an emission wavelength outside the third waveband range. Therefore, the auxiliary beam 50R may be transmitted to the light filter module 140 via the light transmission module LT and the beam-splitting element 420, and via the configuration of the auxiliary light source AL, the illumination system 400 may increase the ratio of red light in the illumination beam 70 to improve the red color performance of the projection image.

Moreover, when the illumination system 400 is applied to the projection device 200 of FIG. 1, via the configuration of the profile of the beam-splitting pattern 421 of the beam-splitting element 420 and the ratio of the area of the first pattern film 421P1 or the second pattern film 421P2 occupied in the second region R2, the projection device 200 may also adjust the positions and the ratios of the first sub-laser beam 60B1 and the second sub-laser beam 60B2 leaving the beam-splitting element 420, so that the projection device 200 may also achieve the above effects and advantages, which are not repeated herein.

Based on the above, the embodiments of the invention have at least one of the following advantages or effects. In an embodiment of the invention, via the configuration of the first pattern film or the second pattern film, the beam-splitting element may control the profile of the beam-splitting pattern and the ratio of the area of the first pattern film or the second pattern film occupied in the second region to control the positions and the ratios of the first sub-laser beam and the second sub-laser beam leaving the beam-splitting element so as to control the angle and the energy distribution of the first sub-laser beam and the second sub-laser beam entering the light-homogenizing element, thereby optimizing the image uniformity. In addition, the uniformity of the first sub-laser beam and the second sub-laser beam may be further improved via the configuration of the diffusion layer of the beam-splitting element. In this way, the projection device adopting the beam-splitting element is able to provide a uniformly colored image, thereby improving the image quality and the visual perception of the user.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A beam-splitting element, wherein the beam-splitting element has a first region and a second region, and the beam-splitting element comprises a first pattern film and a second pattern film, wherein:
   the first pattern film is located on the second region and is configured to allow a light beam with an emission wavelength within a first waveband range to penetrate; and
   the second pattern film is located on the second region and is configured to reflect the light beam with the emission wavelength within the first waveband range,
   wherein the first pattern film and the second pattern film are not overlapped with each other, and the first pattern film and the second pattern film form a beam-splitting pattern together on the second region, wherein a ratio of an area of the first pattern film occupied in the second region is between 30% and 70%,
   wherein the second region comprises a first pattern region and a second pattern region, the first pattern film is located on the first pattern region of the second region, the second pattern film is located on the second pattern region of the second region, the first pattern region has a plurality of first sub-pattern regions, and at least a part of the second pattern region is located between adjacent two of the first sub-pattern regions.

2. The beam-splitting element of claim 1, wherein each of the plurality of first sub-pattern regions is respectively surrounded by the second pattern region.

3. The beam-splitting element of claim 1, wherein the second pattern region has a plurality of second sub-pattern regions, and each of the first sub-pattern regions and each of the second sub-pattern regions have a rectangular shape or a diamond shape, and are alternately arranged in a staggered manner.

4. The beam-splitting element of claim 1, wherein the second pattern region has a plurality of second sub-pattern regions, and each of the first sub-pattern regions and each of the second sub-pattern regions have a strip shape.

5. The beam-splitting element of claim 4, wherein one of the first sub-pattern regions is located between adjacent two of the second sub-pattern regions, and each of the first sub-pattern regions and each of the second sub-pattern regions are randomly distributed.

6. The beam-splitting element of claim 4, wherein an extending direction of each of the first sub-pattern regions is the same as an extending direction of each of the second sub-pattern regions.

7. The beam-splitting element of claim 4, wherein the first pattern region and the second pattern region have a strip shape, and the first pattern region and the second pattern region are extended in a spiral direction around a center to form a swirling pattern.

8. The beam-splitting element of claim 1, wherein the second region comprises a plurality of second sub-regions, and each of the second sub-regions comprises the first pattern film and the second pattern film.

9. The beam-splitting element of claim 1, wherein the beam-splitting element has a first surface and a second surface opposite to each other, the beam-splitting pattern is located on the second surface, and the beam-splitting element further comprises:
   a beam-splitting film located on the first surface and at least partially covering the first region and the second region, wherein the beam-splitting film is configured to allow the light beam with the emission wavelength within the first waveband range to penetrate and reflect a light beam with an emission wavelength within a second waveband range, wherein the first waveband range is different from the second waveband range.

10. The beam-splitting element of claim 9, wherein the beam-splitting element further comprises:
    a diffusion layer located on the second surface and at least covering the second region, wherein the diffusion layer is located between the beam-splitting pattern and the beam-splitting film.

11. A projection device, wherein the projection device comprises an illumination system, a light valve, and a projection lens, wherein:
    the illumination system is configured to provide an illumination beam, and comprises a laser light source unit, a beam-splitting element, and a wavelength conversion module, wherein:
      the laser light source unit is configured to provide a laser beam;
      the beam-splitting element is located on a transmission path of the laser beam, wherein the beam-splitting element has a first region and a second region, the beam-splitting element comprises a first pattern film and a second pattern film, the first pattern film is configured to allow the laser beam to penetrate, and the first pattern film and the second pattern film form a beam-splitting pattern together, wherein the second pattern film is configured to reflect the laser beam, the first pattern film and the second pattern film are not overlapped with each other, and a ratio of an area of the first pattern film occupied in the second region is between 30% and 70%; and
      the wavelength conversion module has wavelength conversion regions and non-conversion regions configured to rotate around an axis of rotation so that the wavelength conversion regions and the non-conversion regions alternately cut into the transmission path of the laser beam;

the light valve is located on a transmission path of the illumination beam, and is configured to convert the illumination beam into an image beam; and the projection lens is located on a transmission path of the image beam, and is configured to project the image beam out of the projection device, wherein the second region comprises a first pattern region and a second pattern region, the first pattern film is located on the first pattern region of the second region, the second pattern film is located on the second pattern region of the second region, the first pattern region has a plurality of first sub-pattern regions, and at least a part of the second pattern region is located between adjacent two of the first sub-pattern regions.

12. The projection device of claim 11, wherein when the wavelength conversion regions cut into the transmission path of the laser beam, the laser beam is converted into a wavelength conversion beam via the wavelength conversion regions, when the non-conversion regions cut into the transmission path of the laser beam, a part of the laser beam penetrates the first pattern film of the beam-splitting element to form a first sub-laser beam and another part of the laser beam is reflected by the second pattern film of the beam-splitting element to form a second sub-laser beam, and the illumination system further comprises a first condenser lens, a light transmission module, a light filter module, and a second condenser lens, wherein:

the first condenser lens is located on transmission paths of the laser beam and the wavelength conversion beam, and is located between the beam-splitting element and the wavelength conversion module;

the light transmission module is located on a transmission path of the first sub-laser beam;

the light filter module is located on transmission paths of the first sub-laser beam and the second sub-laser beam; and the second condenser lens is located between the beam-splitting element and the light filter module, the first sub-laser beam is transmitted to the first region of the beam-splitting element via the light transmission module and is transmitted to the second condenser lens after penetrating the beam-splitting element, after the second sub-laser beam is formed, the second sub-laser beam is directly transmitted to the second condenser lens, and the first sub-laser beam and the second sub-laser beam are transmitted to the light filter module after being respectively incident to the second condenser lens symmetrically and obliquely from both sides of the second condenser lens.

13. The projection device of claim 12, wherein the beam-splitting element has a first surface and a second surface opposite to each other, the beam-splitting pattern is located on the second surface, and the beam-splitting element further comprises:

a beam-splitting film located on the first surface and at least partially covering the first region and the second region, wherein the beam-splitting film is configured to allow the laser beam to penetrate and reflect the wavelength conversion beam.

14. The projection device of claim 13, wherein the beam-splitting element further comprises:

a diffusion layer located on the second surface and at least covering the second region, wherein the diffusion layer is located between the beam-splitting pattern and the beam-splitting film.

15. The projection device of claim 12, wherein the illumination system further comprises:

an auxiliary light source configured to provide an auxiliary beam, wherein the light transmission module is located between the auxiliary light source and the light filter module, and the light transmission module is a dichroic mirror, so that the auxiliary beam may be transmitted to the light filter module.

16. The projection device of claim 11, wherein each of the plurality of first sub-pattern regions is respectively surrounded by the second pattern region.

17. The projection device of claim 11, wherein the second pattern region has a plurality of second sub-pattern regions, and each of the first sub-pattern regions and each of the plurality of second sub-pattern regions have a rectangular shape or a diamond shape, and are alternately arranged in a staggered manner.

18. The projection device of claim 11, wherein the second pattern region has a plurality of second sub-pattern regions, and each of the first sub-pattern regions and each of the second sub-pattern regions have a strip shape.

19. The projection device of claim 18, wherein one of the first sub-pattern regions is located between adjacent two of the second sub-pattern regions, and each of the first sub-pattern regions and each of the second sub-pattern regions are randomly distributed.

20. The projection device of claim 18, wherein an extending direction of each of the first sub-pattern regions is the same as an extending direction of each of the second sub-pattern regions.

21. The projection device of claim 18, wherein the first pattern region and the second pattern region have a strip shape, and the first pattern region and the second pattern region are extended in a spiral direction around a center to form a swirling pattern.

22. The projection device of claim 11, wherein the second region comprises a plurality of second sub-regions, and each of the second sub-regions comprises the first pattern film and the second pattern film.

23. A beam-splitting element, wherein the beam-splitting element has a first region and a second region, and the beam-splitting element comprises a first pattern film and a second pattern film, wherein:

the first pattern film is located on the second region and is configured to allow a light beam with an emission wavelength within a first waveband range to penetrate; and the second pattern film is located on the second region and is configured to reflect the light beam with the emission wavelength within the first waveband range, wherein the first pattern film and the second pattern film are not overlapped with each other, and the first pattern film and the second pattern film form a beam-splitting pattern together on the second region, wherein a ratio of an area of the first pattern film occupied in the second region is between 30% and 70%, wherein the beam-splitting element has a first surface and a second surface opposite to each other, the beam-splitting pattern is located on the second surface, and the beam-splitting element further comprises:

a beam-splitting film located on the first surface and at least partially covering the first region and the second region, wherein the beam-splitting film is configured to allow the light beam with the emission wavelength within the first waveband range to penetrate and reflect a light beam with an emission wavelength within a second waveband range, wherein the first waveband range is different from the second waveband range, and a diffusion layer located on the second surface and at least covering the second region, wherein the diffusion layer is located between the beam-splitting pattern and the beam-splitting film.

24. A projection device, wherein the projection device comprises an illumination system, a light valve, and a projection lens, wherein:

the illumination system is configured to provide an illumination beam, and comprises a laser light source unit, a beam-splitting element, and a wavelength conversion module, wherein:

the laser light source unit is configured to provide a laser beam;

the beam-splitting element is located on a transmission path of the laser beam, wherein the beam-splitting element has a first region and a second region, the beam-splitting element comprises a first pattern film and a second pattern film, the first pattern film is configured to allow the laser beam to penetrate, and the first pattern film and the second pattern film form a beam-splitting pattern together, wherein the second pattern film is configured to reflect the laser beam, the first pattern film and the second pattern film are not overlapped with each other, and a ratio of an area of the first pattern film occupied in the second region is between 30% and 70%; and the wavelength conversion module has wavelength conversion regions and non-conversion regions configured to rotate around an axis of rotation so that the wavelength conversion regions and the non-conversion regions alternately cut into the transmission path of the laser beam;

the light valve is located on a transmission path of the illumination beam, and is configured to convert the illumination beam into an image beam; and the projection lens is located on a transmission path of the image beam, and is configured to project the image beam out of the projection device, wherein the beam-splitting element has a first surface and a second surface opposite to each other, the beam-splitting pattern is located on the second surface, and the beam-splitting element further comprises:

a beam-splitting film located on the first surface and at least partially covering the first region and the second region, wherein the beam-splitting film is configured to allow the laser beam to penetrate and reflect the wavelength conversion beam, and a diffusion layer located on the second surface and at least covering the second region, wherein the diffusion layer is located between the beam-splitting pattern and the beam-splitting film.

* * * * *